Figure 1:
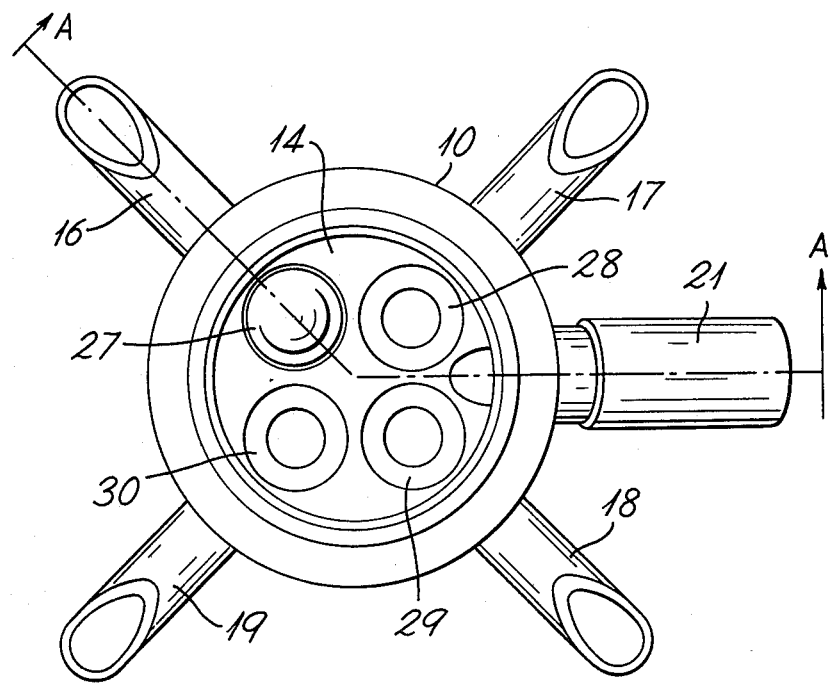

United States Patent [19]

Griffin

[11] 4,395,972
[45] Aug. 2, 1983

[54] MULTI-VALVE CLAWPIECE

[75] Inventor: Tony K. Griffin, Bracknell, England

[73] Assignee: National Research Development Corporation, London, England

[21] Appl. No.: 352,455

[22] Filed: Feb. 25, 1982

Related U.S. Application Data

[63] Continuation of Ser. No. 178,286, Aug. 15, 1980, abandoned.

[30] Foreign Application Priority Data

Sep. 11, 1979 [GB] United Kingdom ............... 7931456

[51] Int. Cl.³ .............................................. A01J 5/06
[52] U.S. Cl. .................................................. 119/14.55
[58] Field of Search ................ 119/14.55, 14.54, 14.08

[56] References Cited

U.S. PATENT DOCUMENTS 2,702,526  2/1955  Torgerson ....................... 119/14.55

FOREIGN PATENT DOCUMENTS 152498  10/1970  New Zealand .
394982  7/1933  United Kingdom ............. 119/14.55

Primary Examiner—Jay N. Eskovitz
Attorney, Agent, or Firm—Cushman, Darby & Cushman

[57] ABSTRACT

A milking machine clawpiece including four independently operable one-way valves, one for each inlet nipple of the clawpiece, the closure members of the valves being each biased to the valve-closed position by the force of gravity acting on the closure members so as to allow flows of liquid into the clawpiece cavity but not in the reverse direction.

6 Claims, 2 Drawing Figures

MULTI-VALVE CLAWPIECE

This is a continuation, of application Ser. No. 178,286 filed Aug. 15, 1980, and now abandoned.

The present invention relates to a clawpiece for use in a milking machine.

The basic components of a milking installation, at least as far as the present invention is concerned, are (1) a cluster of four teat cups including (2) a clawpiece, (3) a suction pump and (4) a pulsator.

Each test cup comprises a rigid outer casing containing a flexible liner which fits over one of the cow's teats. A suction pressure of ½ atmosphere is continuously applied to the "core" space enclosed by the liner. Apart from encouraging a flow of milk into the core space, this suction pressure is also effective to clamp the teat liner on to the teat—this is referred to as "adhesion".

The pressure applied to the annular space between the liner and the rigid casing alternates, however, between ½ atmosphere and atmospheric thanks to the action of the pulsator. At the first of these values, there is zero pressure differential across the liner and milk is sucked from the teat into the core space. This milk passes down a flexible "short milk" tube into one of four tubular inlet "nipples" projecting upwardly from the interior volume of a special junction unit called a "clawpiece". From there the milk is pumped down through an outlet nipple and via a "long milk" tube to an appropriate receptacle. The other three nipples of the clawpiece are connected to similar teat cups and thence to the other teats of the cow's udder.

In operation, when the annular space between the liner and the rigid casing is at atmospheric, the pressure differential across the liner causes the liner to close in on itself to take up the core space and close by pressure the teat end thus preventing milk flow. This alternate flow/no flow mode of operation allows the necessary massage to the teat and stimulates milk flow.

It ought to be mentioned here, to avoid possible confusion, that in this and other current designs of clawpiece, the pulsation distribution block also serves as a rubber bung for the clawpiece There is, however, no transfer path between the pulsation distribution block and the clawpiece by which milk or air passing through the internal volume of the clawpiece can enter the pulsator system or air from the pulsator system can enter the internal volume of the clawpiece.

The drawback with existing designs of clawpiece is that they are prone to increase the risk of infection by spreading mastitis organisms from the clawpiece to the teats; or from teat to teat. The first kind of transfer (the so-called "impact" infection) arises when milk from the clawpiece flows up to one or more of the teat cups to impact against the cow's teat with sufficient force to implant any bacteria present deeply enough into the teat canal to increase the risk of infection. This impacting can occur (1) when the pulsator is operating after one or more of the teats have ceased to give milk (the suction pressure periodically applied to the liner space then being effective to suck milk up from the clawpiece to the teat instead of from the teat to the clawpiece) and (2) when a teat cup loses adhesion in which case air entering the (infected) teat cup sweeps any milk present in that cup back to the other liners. The other cause of infection (which will be called here "transfer" infection) arises when infected milk from one udder quarter spreads gradually down one tube, through the clawpiece, and up other tubes increasing exposure to the other teats.

Two designs of clawpiece have been previously proposed which go some way towards meeting these problems in so far as each inlet nipple is either associated with an individual flap valve mounted in the short milk tube or with one independently operable part of a common valve member having a base portion mounted within the clawpiece cavity and one or more depending skirt portions in effect providing the outlet opening of each inlet nipple with its own flap valve.

Both designs suffer from the defect that to function, the closure members in both cases have to be made of flexible material which on a microscopic scale will include many crevices in which harmful bacteria could harbour.

The two in-situ cleaning methods most widely used for cleaning milking pipeline machines in cowsheds and milking parlours are known as circulation cleaning and acidified boiling water (ABW) cleaning.

Circulation cleaning most often comprises a three stage process consisting of a water pre-rinse, a re-circulated hot wash with detergent-disinfectant solution and a final cold water rinse with or without added hypochlorite.

The second (ABW) in-situ cleaning method, relies solely on heat disinfection. Its main characteristics are: a single stage only; near boiling water being admitted to the milk contact surfaces without preliminary rinsing; the continuous discharge of the water to waste after passing through the machine; acidification of the water for the first half of the process to prevent hard water deposits and to assist cleaning, and a temperature of at least 77° C. (170° F.) on all milk contact surfaces for a minimum of 2 minutes, achieved by means of the high inlet water temperature and the absence of recirculation.

It will be appreciated from this brief discussion that both these methods involve the use of a considerable amount of heat and the attainment of fairly high temperatures in the regions being treated.

Accordingly in the first of the known clawpiece designs discussed above (in which flap valves are mounted within the individual nipples) the problem of keeping the clawpiece free of harmful bacteria is aggravated by the fact that the regions where the valve closure members are connected to their mountings are shielded from the metal nipples by the insulating material of the mountings. This means that it is virtually impossible to raise these regions during the cleaning process to the high temperatures necessary to kill any bacteria present there since these temperatures can only be sustained if metal or some other material with a high thermal capacity is present in the vicinity.

In the second of the known clawpiece designs discussed above (where the flap valves are provided in the clawpiece cavity by a single base-mounted valve member), the problems of hygiene introduced by the presence of microscopically rough surfaces is not helped by the fact that it will in practice be impossible to get heat or chemicals adequately to penetrate into the annular region lying between the engaging surfaces of the base portion of the valve member and that part of the clawpiece housing in which it is a push fit. As both cleaning processes involve using heat, this will result in milk trapped in this annular region being "baked" on to the housing by successive cleaning operations and it is found to be very difficult to remove the baked-on milk deposit that invariably builds up even if the time-consuming operation is carried out of periodically removing the valve from the clawpiece for special cleaning.

It is an object of the present invention to provide a clawpiece in which the risk of impact and transfer infection is avoided or at least significantly reduced without the attendant disadvantages present in the two designs discussed above.

According to the present invention, a clawpiece for use in a milking machine includes four independently operable one-way valves, one for each inlet nipple of the clawpiece, the closure members of the valves being each biased to the valve-closed position by the force of gravity acting on the closure members so as to allow flows of liquid into the clawpiece cavity but not in the reverse direction.

In most conventional designs of clawpiece, the air admission hole provided to aid removal of milk from the teat cup liner into the long milk tubes and to reduce "flooding" and cyclic vacuum fluctuations, extends through the thickness of the clawpiece body to open into the clawpiece cavity. However such an arrangement in the clawpieces of the present invention would prevent the satisfactory operation of the one-way valves and accordingly the air admission hole has to be provided upstream of these valves in some other part of the clawpiece or of the milking apparatus of which the clawpiece forms a part.

Preferably, there is no mechanical connection between the closure members and their associated valve seats although of course the closure members will engage these seats in the valve-closed positions.

Conveniently the passages of the clawpieces inlet nipples extend through a base portion of the clawpiece into the clawpiece cavity to provide associated valve seats in the cavity floor.

Conveniently the closure members are spherical and the valve seats conical. In alternative embodiments the valve seats may by hemi-spherical or of any like downwardly tapering shape and the closure members are designed, in the valve-closed positions, to make line contact with the valve seats or to contact them along a narrow annular band. In one such alternative embodiment, for example, the walls of the valve seats have portions bulging convexly inwardly towards the centre lines of the valve apertures and the closure members are conical and, in the valve-closed positions, engage these convex portions of the valve seats.

Preferably the valve closure members are made of stainless steel, glass or any other easy-to-clean material i.e. one which will not chemically react with the fluids currently used in the cleaning processes described above and which, on a microscopic scale, has a relatively smooth surface unlikely to harbour bacteria.

Figure 2:
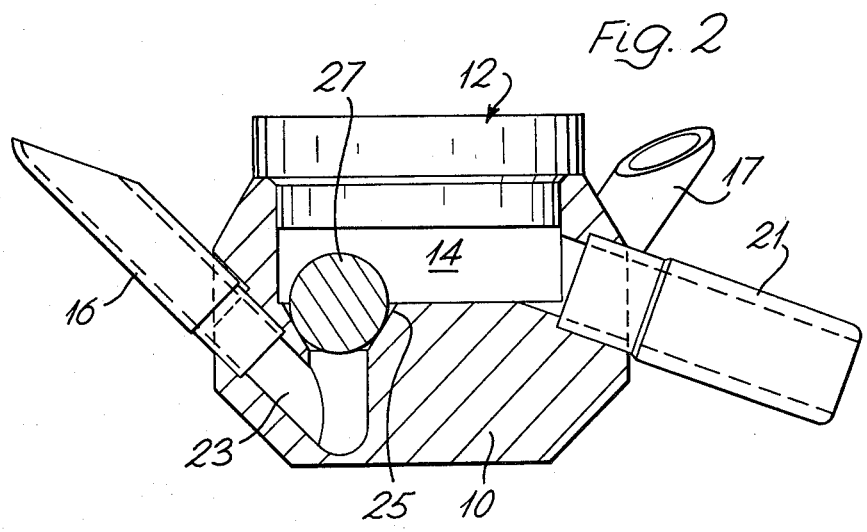

A preferred embodiment of the invention will now be described, by way of example only, with reference to the accompanying drawings in which:

FIG. 1 is a plan view of a clawpiece according to the present invention but with the valve closure members omitted for clarity, and FIG. 2 is a vertical section taken along line A—A of FIG. 1 in which only one of the closure members has been included and in which a pulsation distribution block, diagrammatically illustrated, has also been included.

Reference numeral 10 in these Figures indicates the clawpiece and reference numeral 12 (in FIG. 2) indicates a pulsation distribution block (shown schematically) fitted on top of the clawpiece so as additionally to serve as a bung which closes the clawpiece cavity 14. As already suggested in the general introduction where the operation of the pulsator has been described in detail, there is no transfer path between the pulsation distribution block 12 and the clawpiece 10 by which milk or air passing through the cavity 14 could enter the pulsation system or by which air from the pulsation system could enter cavity 14.

Leading upwardly from the clawpiece 10 are four inlet nipples 16, 17, 18, 19 and leading downwardly is an outlet nipple 21 for connection with short milk tubes and long milk tubes respectively as indicated in the introduction.

The base portions of nipples 16-19 are retained in the outer ends of passages passing through the sie walls of the clawpiece body to bend round and finally open into the internal floor surface of cavity 14.

One such passage (23), for nipple 16, is visible in FIG. 2 from which it will be observed that the internal end of the passage is flared to provide a conical seating 25 for the closure member 27 shown in that Figure. The other nipples 17, 18, 19 will of course be associated with similar passages and closure members to those shown in FIG. 2. The valve seats provided for the three other closure members are indicated in FIG. 1 by the reference numerals 28, 29, 30.

In the illustrated embodiment, the balls providing the closure members are of stainless steel but, as already indicated, other microscopically-smooth materials e.g. glass, could be used instead if desired. These materials, when compared with the flexible materials used for closing the valves in the prior art designs discussed in the introductory portions of the specifications, have the advantages of having (1) microscopically smooth surfaces unlikely to harbour bacteria; and (2) surfaces which will, if anything, become more smooth with use. The feature of having the valve closure members in no way mechanically connected with their seats has the advantage of (3) allowing them to separate from their seats when cleaning fluids are passed through the clawpiece thereby fully exposing all parts of the closure members and the seats to the action of the cleaning fluids and (4) doing away with the small crevices that occur where a valve closure member is somehow attached to the structure in which it is housed (thereby avoiding the creation of protected regions into which the cleaning fluids have difficulty in penetrating fully). The feature of having the valve closure members of spherical or other similar shape is that (5) with time they will if anything gradually grind their seats to a shape in which they give better, rather than worse, long-term seating efficiency. The advantage of having the closure members gravity biassed towards the valve-closed position is (6) that this gives a positive action with no parts whose deterioration could substantially prejudice the effectiveness of this action. In other words the use of gravity in this respect should guarantee that irrespective of the age of the clawpiece or its amount of use the valve closure members must inevitably adopt a valve closed position when there is no flow or insufficient flow into the clawpiece cavity to open them. This leads to the further advantage of (7) zero maintenance and inspection times for the valves. Lastly having the closure members of metal or other large thermal capacity material, has the advantage that (8) it enables these members to be raised during cleaning to the high temperatures required if the bacteria are to be killed.

In use, the clawpiece of the present invention is connected up with the short milk and long milk tubes as hereinbefore described. Under normal circumstances, the clawpiece will work like any other clawpiece but in the event, say, of one of the teats ceasing to give milk, any tendency to suck milk from the clawpiece cavity towards the teat concerned will simply move the relevant closure member into its valve-closed position to prevent any return flow of milk through the associated nipple. Similarly, in the event that adhesion is lost for any of the teat cups associated with the clawpiece, the resulting rush of milk into the clawpiece cavity will once again urge the closure members associated with the other nipples of the clawpiece into their valve-closed positions thereby preventing milk from the disconnected teat cup from reaching any of the other teat cups in the assembly.

In this way the spread of infection from clawpiece to teat or from teat to teat is minimised.

I claim:

1. For use in a milking machine, a clawpiece including four independently operable one-way valves, one for each inlet nipple of the clawpiece, the closure members of the valves being each of a weight greater than the equivalent volume of milk and biased to the valve-closed position by the force of gravity acting on the closure members so as to allow flow of liquid into the clawpiece cavity but not in the reverse direction, the passages of the clawpiece's inlet nipples extending through a base portion of the clawpiece into the clawpiece cavity to provide associated valve seats in the cavity floor, said valve seats having a downwardly tapering shape and the closure members being designed so as, in the valve-closed positions, to make line contact with the valve seats so as to contact them along a narrow annular band.

2. A clawpiece as claimed in claim 1 in which the valve seats are conical and the closure members are spherical.

3. A clawpiece as claimed in claim 1 in which the valve seats are hemi-spherical and the closure members are spherical.

4. A clawpiece as claimed in claim 1 in which the walls of the valve seats have portions bulging convexly inwards towards the centre lines of the valve apertures and the closure members are conical and, in the valve-closed positions, engage said convex portions of the valve seats.

5. A clawpiece as claimed in claim 1 in which the valve closure members are made of stainless steel.

6. A clawpiece as claimed in claim 1 in which the valve closure members are made of glass.

* * * * *